United States Patent
Lee

(10) Patent No.: US 11,138,253 B2
(45) Date of Patent: *Oct. 5, 2021

(54) METHODS AND APPARATUS TO DETERMINE TAGS FOR MEDIA USING MULTIPLE MEDIA FEATURES

(71) Applicant: The Nielsen Company (US), LLC, New York, NY (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/457,429

(22) Filed: Jun. 28, 2019

(65) Prior Publication Data

US 2019/0370278 A1    Dec. 5, 2019

Related U.S. Application Data

(63) Continuation of application No. 14/886,957, filed on Oct. 19, 2015, now Pat. No. 10,380,166.

(60) Provisional application No. 62/185,965, filed on Jun. 29, 2015.

(51) Int. Cl.
*G06F 17/30* (2006.01)
*G06F 16/432* (2019.01)

(52) U.S. Cl.
CPC .......... *G06F 16/433* (2019.01); *G06F 16/434* (2019.01)

(58) Field of Classification Search
CPC ........ G06F 16/13; G06F 16/24; G06F 16/156; G06N 5/00; G06N 3/00; G06B 13/00
See application file for complete search history.

(56) References Cited

U.S. PATENT DOCUMENTS

| 6,675,162 | B1 | 1/2004 | Russell-Falla et al. |
| 7,130,466 | B2 | 10/2006 | Seeber |
| 7,805,337 | B1 | 9/2010 | Ogg |

(Continued)

OTHER PUBLICATIONS

United States Patent and Trademark Office, "Notice of Allowance," mailed in connection with U.S. Appl. No. 14/886,957, dated Mar. 20, 2019, 10 pages.

(Continued)

*Primary Examiner* — Hung D Le
(74) *Attorney, Agent, or Firm* — Hanley, Flight & Zimmerman, LLC

(57) ABSTRACT

Example methods, apparatus, systems and articles of manufacture are disclosed to determine tags for unknown media using multiple media features. Disclosed examples extract features from audio and image portions of the unknown media. Disclosed examples weight the features based at least partially on respective recognition technologies used to extract the features to determine corresponding weighted features, wherein disclosed examples assign a first weight to a first feature extracted by an image-based recognition technology, and assign a second weight, different from the first weight, to a second feature extracted by an audio-based recognition technology. Disclosed examples search a database of pre-tagged media with a combination of the weighted features to generate a list of suggested tags for the unknown media. Disclosed examples assign one or more tags from the list of suggested tags to the unknown media.

18 Claims, 5 Drawing Sheets

(56) References Cited

U.S. PATENT DOCUMENTS

| | | | |
|---|---|---|---|
| 7,860,872 B2 | 12/2010 | Serjeantson et al. | |
| 8,290,982 B2 | 10/2012 | Lara et al. | |
| 8,438,163 B1 | 5/2013 | Li et al. | |
| 8,527,273 B2 * | 9/2013 | Mohri | G10L 15/00 704/255 |
| 8,825,655 B1 | 9/2014 | Li et al. | |
| 9,129,008 B1 * | 9/2015 | Kuznetsov | G06F 16/313 |
| 9,355,099 B2 | 5/2016 | Giridharan | |
| 9,966,112 B1 | 5/2018 | Kulkarni et al. | |
| 2007/0050406 A1 | 3/2007 | Byers | |
| 2007/0112837 A1 | 5/2007 | Houh et al. | |
| 2008/0091513 A1 | 4/2008 | Waggoner | |
| 2008/0228749 A1 | 9/2008 | Brown | |
| 2008/0235740 A1 * | 9/2008 | Gupta | H04N 21/42204 725/86 |
| 2008/0270110 A1 * | 10/2008 | Yurick | G06F 16/685 704/3 |
| 2008/0270344 A1 * | 10/2008 | Yurick | G06F 16/4393 |
| 2011/0238506 A1 | 9/2011 | Perkowski et al. | |
| 2012/0265735 A1 | 10/2012 | McMillan et al. | |
| 2013/0108160 A1 * | 5/2013 | Yamazoe | G06K 9/723 382/177 |
| 2013/0144136 A1 * | 6/2013 | Rymut | A61B 5/4875 600/310 |
| 2013/0339362 A1 | 12/2013 | Yang | |
| 2014/0164384 A1 | 6/2014 | Giridharan | |
| 2014/0181150 A1 | 6/2014 | Hancock | |
| 2014/0222755 A1 | 8/2014 | Söderberg et al. | |
| 2014/0355907 A1 | 12/2014 | Pesavento et al. | |
| 2014/0366052 A1 | 12/2014 | Ives et al. | |
| 2015/0012946 A1 * | 1/2015 | Woods | H04N 21/2668 725/41 |
| 2015/0081277 A1 * | 3/2015 | Behi | G06F 40/205 704/9 |
| 2015/0149469 A1 | 5/2015 | Xu et al. | |
| 2015/0222755 A1 | 8/2015 | Chintala | |
| 2015/0375117 A1 * | 12/2015 | Thompson | H04N 21/254 463/9 |
| 2016/0335339 A1 | 11/2016 | Venkataraman et al. | |
| 2016/0335359 A1 * | 11/2016 | Grigoreva | G06F 16/9535 |
| 2016/0378749 A1 | 12/2016 | Lee | |

OTHER PUBLICATIONS

United States Patent and Trademark Office, "Non-final Office Action," mailed in connection with U.S. Appl. No. 14/886,957, dated Oct. 1, 2018, 10 pages.

United States Patent and Trademark Office, "Final Office Action," mailed in connection with U.S. Appl. No. 14/886,957, dated May 11, 2018, 12 pages.

United States Patent and Trademark Office, "Non-final Office Action," mailed in connection with U.S. Appl. No. 14/886,957, dated Nov. 3, 2017, 13 pages.

United States Patent and Trademark Office, "Advisory Action," mailed in connection with U.S. Appl. No. 14/886,957, dated Aug. 2, 2018, 3 pages.

* cited by examiner

METHODS AND APPARATUS TO DETERMINE TAGS FOR MEDIA USING MULTIPLE MEDIA FEATURES

CROSS REFERENCE TO RELATED APPLICATIONS

This patent arises from a continuation of U.S. patent application Ser. No. 14/886,957, filed Oct. 19, 2015, now U.S. Pat. No. 10,380,166, which claims the benefit of U.S. Provisional Patent Application Ser. No. 62/185,965, filed Jun. 29, 2015. U.S. patent application Ser. No. 14/886,957 and U.S. Provisional Patent Application Ser. No. 62/185,965 are hereby incorporated herein by reference in their respective entireties. Priority to U.S. patent application Ser. No. 14/886,957 and U.S. Provisional Patent Application Ser. No. 62/185,965 is claimed.

FIELD OF THE DISCLOSURE

This disclosure relates generally to advertisements, and, more particularly, to methods and apparatus to determine tags for media using multiple media features.

BACKGROUND

Tracking media assets used by companies to advertise their products or brands typically requires coding or tagging each media asset with company information. For example, the media asset may be tagged with the name of the company, the manufacturer of the product, the brand of the product manufacturer, the logo of the company, the product type, the price range of the product, a target market for the product or the like.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
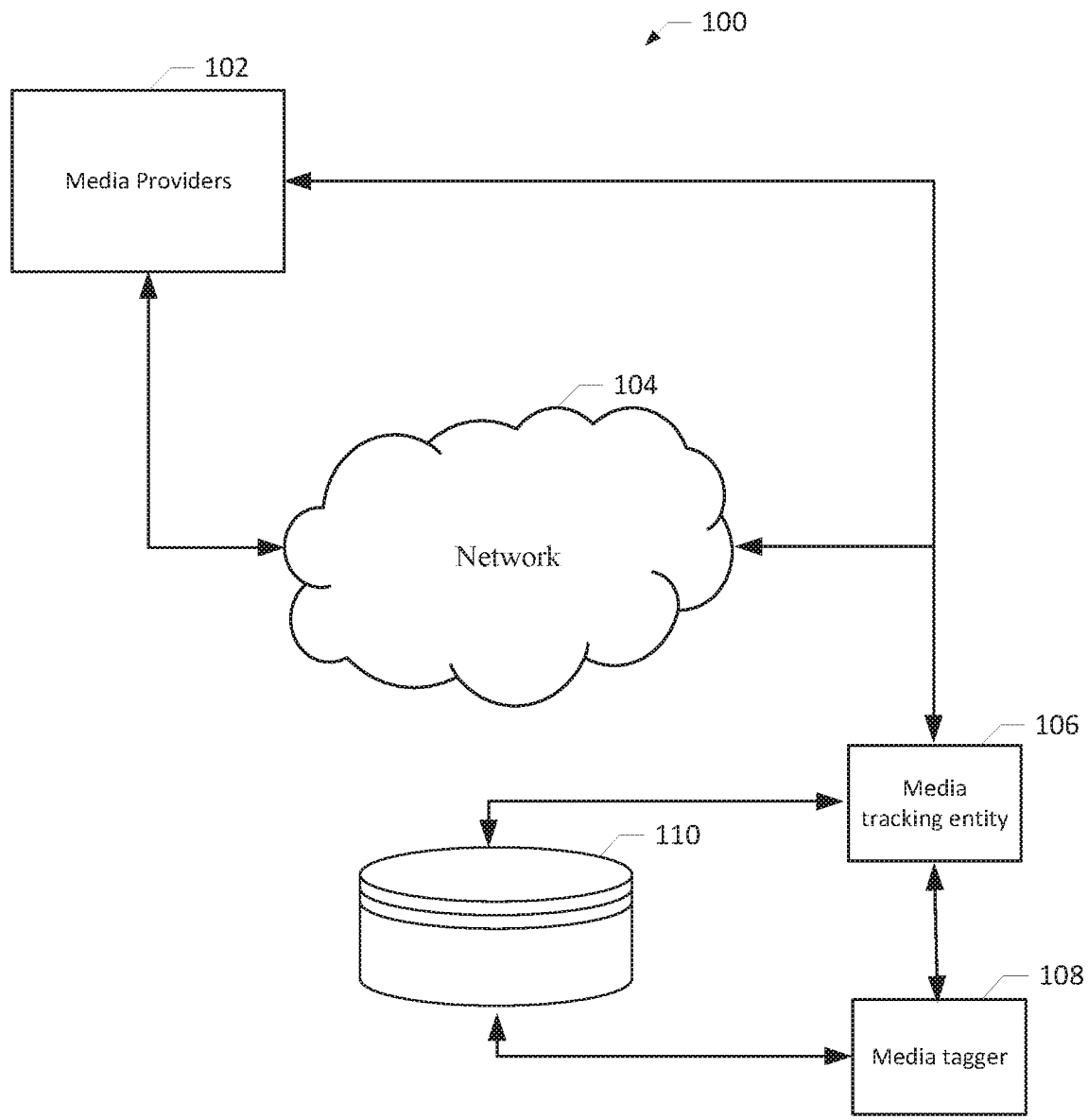
FIG. 1 is an example environment in which an example media tagger operates.

Traditionally, audience measurement entities track the number, type and frequency of media assets used by different companies to advertise their products or brands. A media asset may include any type of media such as video, audio, print, radio or web advertisements. Before the media asset can be associated with a company, brand or product, the media asset is tagged or coded with company information. In this application codes and tags are used interchangeably. The company information may include the company that is advertising the product, the logo of the company, the product manufacturer, the product type, the name of the product, the price range of the product, a target market for the product or the like. Once the media asset is coded or tagged with company information, each occurrence of the media asset can be associated with a company, brand, logo, product, product type, target market, price range or the like.

A logo is an easily recognizable, reproducible design element, often including a name, symbol, specified colors or trademark. A logo is a quick, visual representation of a brand's message and position. A well designed logo should evoke some memory or emotion from the viewer depending upon their relationship with the brand. A logo is a tool to help communicate a brand and represent a brand.

A brand is every interaction with and marketing practice of a name or design that identifies and differentiates one business, product, or service from another. A brand encompasses the positioning, the messaging and communications, the visual design, the target market, the voice, the marketing and promotions, the presence, and the experience any individual has with the business, product or service online, offline, or in person.

Tags can be added to the media at any point in the distribution chain. In some examples, the tags added at different point in the distribution chain may enhance the ability to detect piracy in the distribution chain.

Methods, apparatus and computer readable instructions that, when executed, cause a machine to at least determine codes/tags for new or unknown media using multiple media features are disclosed herein. In the illustrated example, audio and image features are extracted from the new or unknown media. The extracted features are weighted and then used as queries for one or more search engines using a database of pre-tagged media. A list of pre-tagged documents, along with the relevant tags, is produced and used to determine the tags for the new or unknown media.

Features from the audio portion of the media may be extracted using a number of different recognition technologies. In the illustrated example, the audio features include a list of spoken words occurring in the audio portion of the media. In one example, the list of spoken words is extracted from the audio portion of the media using a speech recognition engine. In some examples, a transcript of the audio portion of the media is accessed and used as the list of spoken words. In some examples, the closed captioning data is accessed and used as the list of spoken words. The list of words includes multiple occurrences of the same word when the same word occurs multiple times in the audio stream.

In some examples, the audio features may include a tune, a jingle or melody, or sequence of notes associated with a company. The audio features may also include distinctive sounds, for example the sound of a motor racing, tiers squealing, dishes clinking or the like. A word or phrase describing the sound, or a product type or company name associated with the sound, will be added to the list of words from the audio stream from the media.

The identified audio features may be assigned to one or more categories. The categories may include the name of the company advertising the product or brand, the brand of the product being advertised, the product manufacturer, the product type, the name of the product, the price range of the product, a target market for the product or the like.

Features from the image portion of the media are extracted using a number of different recognition technologies. The identified image features may be assigned to one or more categories, and/or the words that describe the image feature may be added to the list of words identified from the audio stream.

A logo engine is used to locate and recognize any logos that appear in the image portions of the media. A logo is a graphic representation or symbol of a company name, trademark, abbreviation or the like. The output of the logo engine may be a company name or brand and may be used to assign the results to the corresponding category. For example, if the logo recognition engine identified a brand of Ford trucks as the "Ram" brand, "Ram" would be assigned to the brand category and "Ford" would be assigned to the company and/or manufacturer category. In some examples, the logo may be associated with the media production or distribution.

Printed words in the image portion of the media are extracted using an optical character recognition (OCR) engines. The output from the OCR engine is a list of words found in the images of the media. In some examples, the words may be assigned to a category, and/or the words that describe the image feature may be added to the list of words identified from the audio stream.

Images of objects are identified using an object recognition engine. For example, an image of a vehicle like a car or truck may be identified. The output of the object recognition engine may be a list of words describing the identified objects or may be a description of a product type, for example trucks. When the identified object is a product type, the identified object is assigned to that category.

Graphic features in the media may be identified using a graphic feature recognition engine. For example, a dominant color may be identified, shapes, and vertical or horizontal edges or the like may be identified. Each of the graphic features is identified and associated with one or more words.

Once all the audio and image features have been extracted they are combined and weighted. The features include lists of words or phrases generated by the different recognition technologies. When the logo recognition engine finds a match, the features will also include a category with an assigned value (e.g. a company or brand name, a product type, or the like). In some examples, the lists of words/phrases from some of the different recognition technologies will be compared to a list of words or phrase of known brands, manufacturers or product types. When a match is found, the word will be assigned to that category. For example, when the word "truck" is extracted and compared to the list of known product types, a match will exist and "trucks" will be assigned to the category for the type of product (e.g. product type).

In some examples, feedback between the features identified in the audio or image portions of the media are used to weight the different features that were identified. In some examples, when the logo recognition engine identifies an image of a logo, the corresponding word in the audio portion is weighted higher. For example, if the logo recognition engine identifies the image of "golden arches" as the McDonalds logo, and the speech recognition engine identified the word "McDonalds", the word "McDonalds" would be weighted higher.

In some examples, there may be a hierarchy of recognition technologies that weight the identified features. For example, a logo recognition engine has few false positives, so output from the logo engine may be given the highest weight. The output of the OCR engine may be given the next highest weight, followed by the speech recognition engine and then the graphic feature recognition engine. In other examples, the weighting values given by the different recognition technologies may be different.

The list of weighted words and categories are used as queries for one or more search engines. The searches are conducted using a database of previously tagged media. In some examples the database of pre-tagged media is an internal database for a media tracking company or an audience measurement entity, for example The Nielsen Company, LLC. The previously tagged media in the database of pre-tagged media includes media that has been tagged with the company information for the product being advertised in the media. The company information may include the company name, the company brand, the company logo, the product name, the product type, the manufacture's name, keywords, key phrases associated with a product or brand and the like.

The results of the searches are a list of pre-tagged documents that may be relevant to the current media, along with the codes/tags for the pre-tagged documents identified. The search engines include a relevance score for each of the listed documents. In some examples, the list of codes/tags are used as suggestions for tags for the media being coded/tagged (e.g. the unknown media). A user may approve the suggestion for the tag and thereby assign the tag to the media. In other examples, when the relevance score for a document is above a threshold value, the identified codes/tags are automatically assigned to the new or unknown media. Once tags have been assigned to the media, the media, along with the tags, may be added to the pre-tagged database.

FIG. 1 is an example environment 100 in which media recognition and tagging may be carried out. The example environment includes media providers 102, a network 104, for example the Internet, a media tracking entity 106, a media tagger 108 and a database of pre-tagged media 110.

In this application, the terms include, includes and including are open ended such that the items, steps or elements are not limited to the listed items, steps or elements following these terms. For example, the example environment shown in FIG. 1 is not limited to the items shown and may include additional elements.

In FIG. 1, the media providers 102 are communicatively coupled to the media tracking entity 106 directly and indirectly through network 104. The media tagger 108 is communicatively coupled to the media tracking entity 106. The database of pre-tagged media 110 is communicatively coupled to the media tracking entity 106 and the media tagger 108.

Media providers 102 provide media to users. As used herein, the term "media" includes any type of content (audio, video, etc.) and/or advertisement delivered via any type of distribution medium. Thus, media includes television programming or advertisements, radio programming or advertisements, movies, web sites, print, streaming media, etc.

The media tracking entity 106 tracks the media produced by the media providers 102 across different distribution media. The media tracking entity 106 identifies advertisements in the media produced by the media providers 102. For example, when an advertisement is identified, it is compared to the database of pre-tagged media 110. When the advertisement does not match an existing advertisement in the database of pre-tagged media 110, the advertisement is classified as a new or unknown media and is passed to the media tagger 108.

The media tagger 108 extracts audio and/or image features from the new or unknown media. The extracted features are weighted and then used as queries for one or more search engines using the database of pre-tagged media 110. A list of pre-tagged documents, along with the relevant tags, is produced and used to determine the tags for the new or unknown media. In some examples, the newly tagged media is added/stored into the database 110.

In the illustrated example of FIG. 1, the media tagger 108 and the database 110 are shown as separate elements from the media tracking entity 106. In other examples, the media tagger 108, the database 110, or both the media tagger 108 and the database 110 may be integrated with/into the media tracking entity 106. In other examples, the media tagger 108, the database 110 or both the media tagger 108 and the database 110 may be remote from the media tracking entity 106 and may be accessed through the network 104, for example the Internet.

Figure 2:
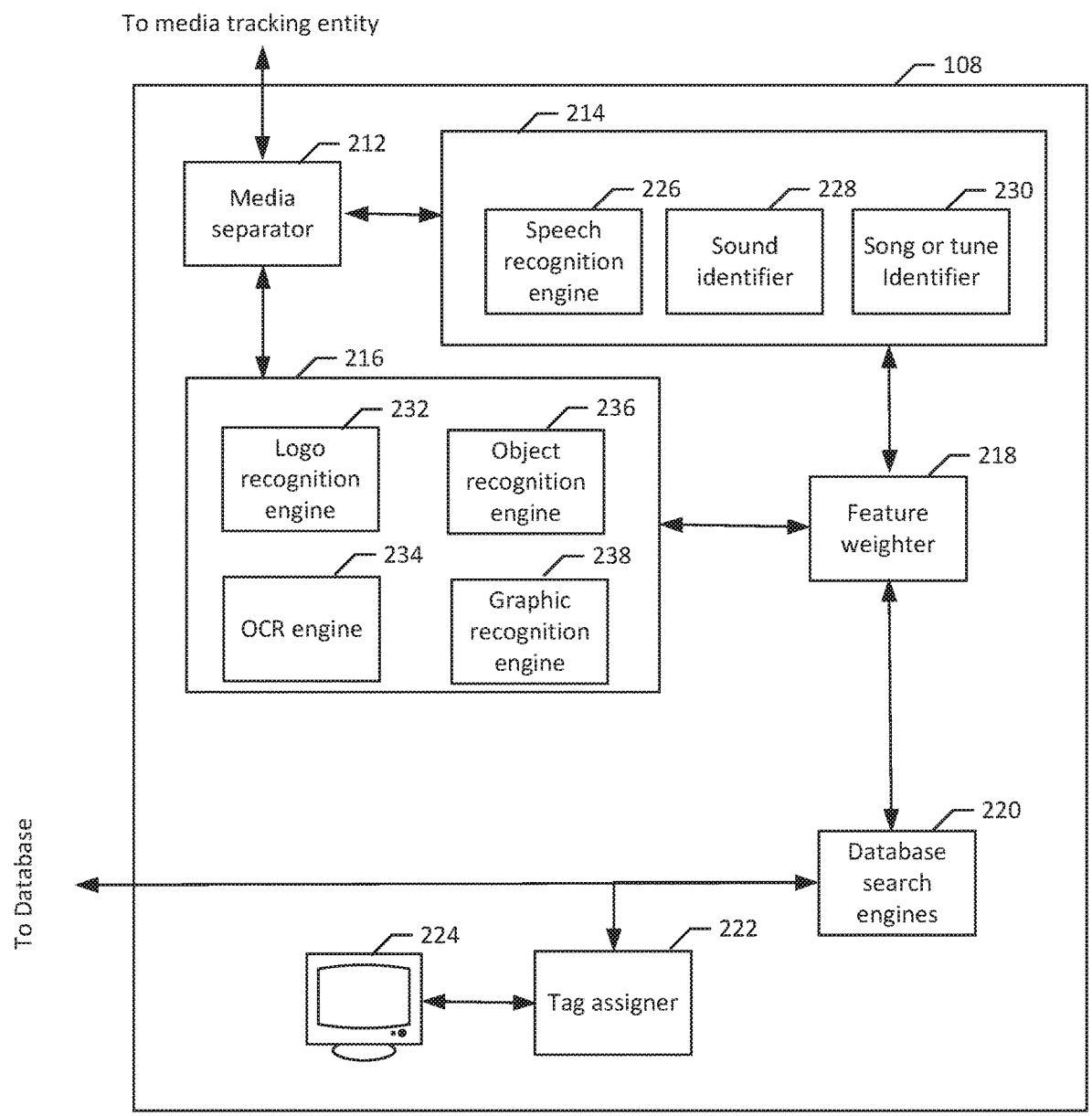
FIG. 2 is an example block diagram of the media tagger of FIG. 1.

FIG. 2 is an example block diagram of a media tagger, for example the media tagger 108 of FIG. 1. Media tagger 108 includes a media separator 212, an audio extractor 214, an image extractor 216, a feature weighter 218, database search engines 220, a tag assigner 222 and a display 224. The media separator 212 is communicatively coupled to the media tracking entity 106 of FIG. 1, the audio extractor 214 and the image extractor 216. The audio extractor 214 and the image extractor 216 are communicatively coupled to the feature weighter 218. The feature weighter 218 is communicatively coupled to the database search engines 220. The database search engines 220 are communicatively coupled to a database of pre-tagged media, for example the database 110 of FIG. 1, and the tag assigner 222. The tag assigner 222 is communicatively coupled to a database of pre-tagged media, for example the database 110 of FIG. 1, and display 224.

In operation, the media separator 212 accesses a new or unknown media from the media tracking entity 106 of FIG. 1. The media separator 212 separates the audio portions from the image portions of the unknown media and passes the audio portion to the audio extractor 214 and the image portions to the image extractor 216. In this example, when features and/or data is passed from one functional block to another functional block, the features and/or data may be passed directly between functional blocks, stored temporarily in memory, or the like.

The audio extractor 214 extracts audio features from the audio portion of the unknown media, as described further below. The extracted audio features are passed to the feature weighter 218. In some examples, the type of recognition engine or recognition technology used to extract each audio feature is also passed to the feature weighter 218. The image extractor 216 extracts image features from the image portion of the unknown media, as described further below. The extracted image features are passed to the feature weighter 218. In some examples, the type of recognition engine or recognition technology used to extract each image feature is also passed to the feature weighter 218.

The audio extractor 214 may use multiple recognition engines or recognition technologies to extract different audio features. In this example, the audio extractor 214 uses three different recognition engines or recognition technologies to extract audio features. In other examples, more or fewer recognition technologies may be used to extract the audio features. The first recognition technology is a speech recognition engine 226 to extract a list of words spoken in the audio portion of the media. Any speech to text recognition engine may be used, for example Google's speech to text recognition engine may be used. The output of the speech recognition engine 226 is a list of words spoken in the audio portion of the media.

The second recognition technology is a sound identifier 228. The sound identifier may compare sound samples extracted from the audio portion of the media to a database of previously stored sounds. For example, some previously stored sounds may include the sound of a car engine going by, the sound of dishes clinking in a restaurant, the sound of birds singing, or the like. The previously stored sounds have words describing the sounds that are associated with the stored sounds. When a match between a sound segment and a previously stored sound is found, the word describing the sound is used as the output to the sound identifier 228.

The third recognition technology is a song or tune identifier 230. The song or tune identifier 230 may extract samples of music or notes from the audio portion of the media. The song or tune can be compared to a database of previously stored songs or tunes. The database may be private or may be a public database accessible through the Internet. When a match is found, the song title or the company associated with the song or tune is used as the output of the song or tune identifier 230. The song or tune may be recognized using a "signature" of the audio taken according to signature techniques.

In some examples, the audio information is already extracted. For example, a transcript of the audio portion of the media may be accessed and used as the list of spoken words. In some examples, the closed captioning data is accessed and used as the list of spoken words.

The output from any of the recognition engines or recognition technologies used to extract audio features may be a null set. For example, the output from the sound identifier 228 may be blank when the sound identifier 228 did not identify any sounds in the audio portion of the unknown media.

The image extractor 216 may also uses multiple recognition engines or recognition technologies to extract different image features. In this example, the image extractor 216 uses four different recognition engines or technologies to extract image features. In other examples, more or fewer recognition technologies may be used to extract the image features. The first recognition technology is a logo recognition engine 232 to identify a logo contained in the image portion of the unknown media. The logo recognition engine 232 uses a database of previously identified logos. The logo recognition engine 232 uses pattern matching between areas identified in the images of the unknown media and the database of previously identified logos. When a match is found, the logo recognition engine 232 uses the name of the company or the name of the brand as an output. A brand may include a company name, a product name, a logo, a product type, a word or phrase that identifying a product, service, or organization. Some example brands are: Coke®, Tide™, Ford®, Kleenex™ and Windows®.

The second recognition technology is an optical character recognition (OCR) engine 234. The OCR engine 234 is used on the words printed in the image portions of the unknown media. The output from the OCR engine 234 is a list of words that were printed in the image portion of the unknown media.

The third recognition technology is an object recognition engine 236. The object recognition engine 236 is used to identify objects in the image potions of the unknown media. The object recognition engine 236 uses pattern matching between a database of previously identified objects and objects located in the image portions of the unknown media. For example, some previously identified objects may include a vehicle, a building, an airplane, a lake or the like. When a match is found, the object recognition engine 236 output the name of the recognized object.

The fourth recognition technology is a graphic recognition engine 238. The graphic recognition engine 238 locates and identifies graphic features in an image. The graphic features identified may include a dominant color, shapes, for example a square, distinct horizontal or vertical lines, and the like. The output of the graphic recognition engine 238 is a list of words describing the geographic features identified in the image portions of the media.

The output from any of the recognition engines or technologies used to extract image features may also be a null set. For example, the output from the logo recognition engine 232 may be blank when the logo recognition engine 232 did not locate a logo in the image portion of the unknown media.

The feature weighter 218 weights and combines the audio features and the video features into a list of features. The features may include a list of words, a list of keywords, a list of key phrases, a brand, a product name, a product type, the product manufacturer and the like. In some examples, the feature weighter 218 may use feedback between the audio features and the video features to weight the different features. In other examples, the feature weighter 218 may weight a feature based on the engine or technology used to extract the feature.

For example, the feature weighter 218 will give the highest weight to a feature extracted by the logo recognition engine 232, the next highest weight will be given to features extracted by the OCR engine 234, the next highest weight will be given to features extracted by the speech recognition engine 226 and the lowest weight will be given to features extracted by a graphic recognition engine 238. In some examples, the relative weights between the logo recognition engine 232, the OCR engine 234, the speech recognition engine 226 and the graphic recognition engine 238 are 10, 5, 2 and 1 respectively. The feature weighter 218 passes the list of weighted features to the database search engines 220.

The database search engines 220 use the list of weighted features from the feature weighter 218 to query a database of pre-tagged media, for example database 110. The database search engines may use one or more search engines to query the database of pre-tagged media. When multiple search engines are used, the different search engines may use different techniques to search the database. For example, one search engine may use a vector space model for document retrieval. Another search engine may use a probabilistic information retrieval technique.

In some examples, the queries use the weighted list of words from the feature weighter 218. In other examples, when detected, the categories may be used to narrow the search space. For example, the database search engines 220 may limit the search space to a company name, brand name, a manufacturer's name, a product name, a product type or the like.

The results from the database search engines 220 are passed to the tag assigner 222. The tag assigner 222 may display the results of the searches on the display 224, on a remote display (not shown), save the list for later use, or print the list on a printer (not shown). The results from the searches are a list of documents found in the database of pre-tagged media that are relevant to the unknown media. The list includes a relevancy score indicating how relevant the listed document is with respect to the unknown media. In addition, a list of tags for each of the identified document may also be displayed. A user can confirm that one or more of the tags from a relevant document apply to the unknown media. Once confirmed, the tags are assigned to the media and the media, along with the assigned tags, is stored into the database of pre-tagged media (e.g. database 110).

In some examples, the relevancy score is compared to a threshold, for example 85% relevant. When the relevancy score is above the threshold, the tag assigner 222 automatically assigns the tags from the relevant document to the unknown media and stores the now tagged media, along with the assigned tags, into the database of pre-tagged media (e.g. database 110). In some examples, the threshold is between 75% and 100%. Once the unknown media is tagged and stored in database 110, the media tracking entity 106 can track and assign impressions of the media to the company that is advertising the product in the media.

While an example manner of implementing the media tagger 108 of FIG. 1 is illustrated in FIG. 2, one or more of the elements, processes and/or devices illustrated in FIG. 2 may be combined, divided, re-arranged, omitted, eliminated and/or implemented in any other way. Further, the example media separator 212, an audio extractor 214, an image extractor 216, a feature weighter 218, database search engines 220, a tag assigner 222 and a display 224 and/or, more generally, the example media tagger 108 of FIG. 2 may be implemented by hardware, software, firmware and/or any combination of hardware, software and/or firmware. Thus, for example, any of the example media separator 212, an audio extractor 214, an image extractor 216, a feature weighter 218, database search engines 220, a tag assigner 222 and a display 224 and/or, more generally, the example media tagger 108 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media separator 212, an audio extractor 214, an image extractor 216, a feature weighter 218, database search engines 220, a tag assigner 222 and a display 224 is/are hereby expressly defined to include a tangible computer readable storage device or storage disk such as a memory, a digital versatile disk (DVD), a compact disk (CD), a Blu-ray disk, etc. storing the software and/or firmware. Further still, the example media tagger 108 of FIG. 2 may include one or more elements, processes and/or devices in addition to, or instead of, those illustrated in FIG. 3, and/or may include more than one of any or all of the illustrated elements, processes and devices.

Figure 3:
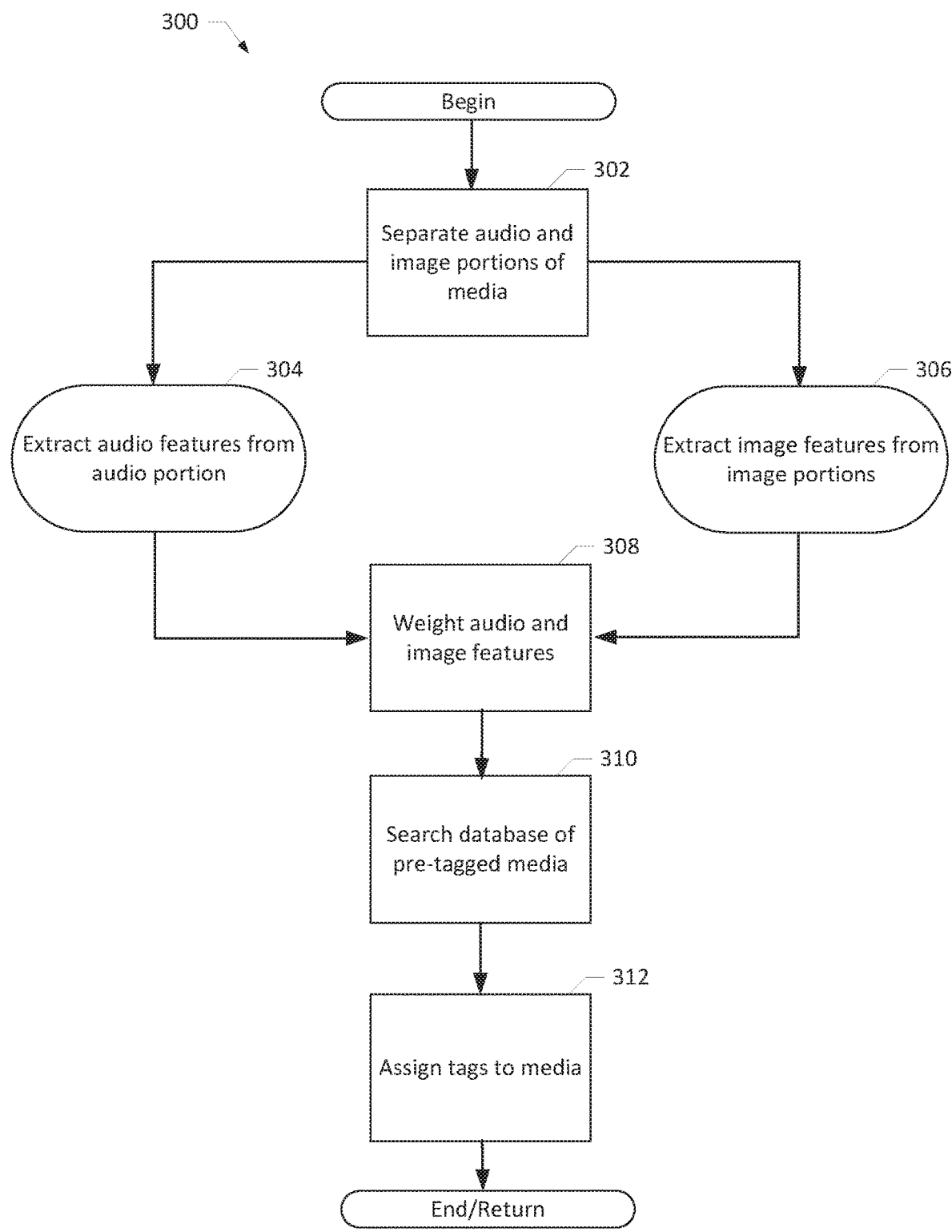
FIG. 3 is a flowchart representative of example machine readable instructions for implementing the media tagger of FIGS. 1 and 2.

A flowchart representative of example machine readable instructions for implementing the media tagger 108 of FIG. 2 is shown in FIG. 3. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example media tagger 108 may alternatively be used. For example, the order of execution of the blocks may be changed, and/or some of the blocks described may be changed, eliminated, or combined.

As mentioned above, the example processes of FIGS. 3, 4, and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 300 of FIG. 3 begins where the media separator 212 of FIG. 2 accesses a new or unknown media (block 302). The media separator 212 separates the audio portion of the media from the image portions of the media. The media separator 212 passes the audio portion of the media to the audio extractor 214 of FIG. 2 and passes the image portions of the media to the image extractor 216 of FIG. 2. Flow continues in parallel at block 304 and 306.

The audio extractor 214 extracts audio features from the audio portion of the unknown media (block 304). The extracted audio features are passed to the feature weighter 218 of FIG. 2. In some examples, the type of engine or technology used to extract each audio feature is also passed to the feature weighter 218. Flow continues at block 308.

The image extractor 216 extracts image features from the image portion of the unknown media (block 306). The extracted image features are passed to the feature weighter 218. In some examples, the type of engine or technology used to extract each image feature is also passed to the feature weighter 218. Flow continues at block 308.

The feature weighter 218 weights and combines the audio features and the video features into a list of features (block 308). The features may include a list of words, a list of keywords, a list of key phrases, a category with an assigned value, for example, a brand, a product name, a product type, the product manufacturer and the like. In some examples, the feature weighter 218 may use feedback between the audio features and the video features to weight the different features. In other examples, the feature weighter 218 may weight a feature based on the type of engine or technology used to extract the feature. The feature weighter 218 passes the list of weighted features to the database search engines 220 of FIG. 2. Flow continues in block 310.

The database search engines 220 use the list of weighted features to query a database of pre-tagged media, for example database 110 (block 310). The database search engines may use one or more search engines to query the database of pre-tagged media. When multiple search engines are used, the different search engines may use different techniques to search the database. For example, one search engine may use a vector space model for document retrieval. Another search engine may use a probabilistic information retrieval technique.

In some examples, the queries use a list of words from the feature weighter 218. In other example, when detected, the categories may be used to narrow the search space. For example, the search engines may limit the search space to a brand name, a manufacturer's name, a product name, a product type or the like. The results from the search engines are passed to the tag assigner 222 of FIG. 2. Flow continues at block 312.

The tag assigner may display the results of the searches on display 224 of FIG. 2, on a remote display (not shown), save the list for later use (block 312). The results from the searches are a list of documents found in the database of pre-tagged media that are relevant to the unknown media. The list includes a relevancy score indicating how relevant the listed document is with respect to the unknown media. In addition, a list of tags for each of the identified document will be displayed. A user can confirm that one or more of the tags from a relevant document apply to the unknown media. Once confirmed, the tags are assigned to the media and the media, along with the assigned tags, is stored into the database of pre-tagged media (e.g. database 110).

In some examples, the relevancy score is compared to a threshold. When the relevancy score is above the threshold, the tag assigner automatically assigns the tags from the relevant document to the unknown media and stores the now tagged media, along with the assigned tags, into the database of pre-tagged media (e.g. database 110). In some examples the relevancy score threshold is between 75% and 100%, for example 85%. Once the unknown media is tagged and stored in database 110, the media tracking entity 106 can track and assign impressions of the media to the company that is advertising the product in the media.

Figure 4:
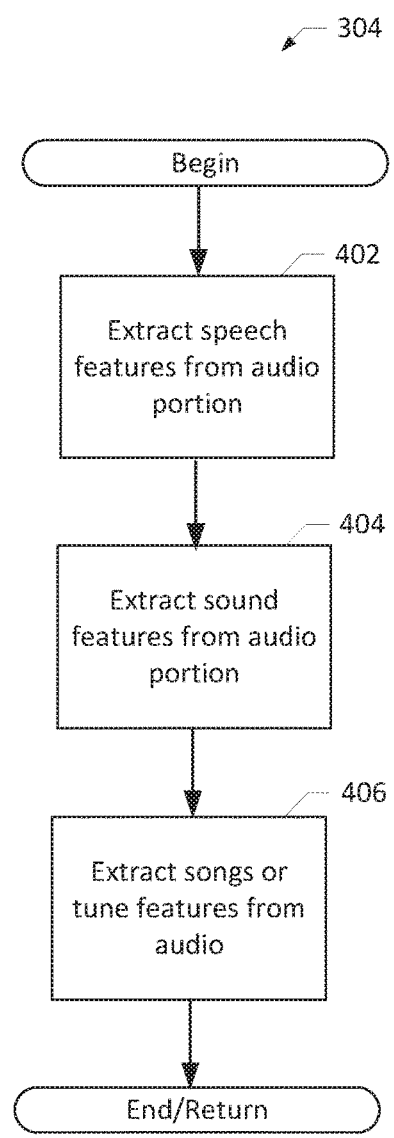
FIG. 4 is a flowchart representative of example machine readable instructions for implementing the extract audio features functionality of FIG. 3.

FIG. 4 is a flowchart representative of example machine readable instructions for implementing the process in block 304 of FIG. 3 (extract audio features). The speech recognition engine 226 of FIG. 2 extracts a list of words spoken in the audio portion of the unknown media (block 402). Any speech to text recognition engine may be used, for example Google's speech to text recognition engine may be used. The output of the speech to text engine is a list of words spoken in the audio portion of the media. Flow continues at block 404

The sound identifier 228 of FIG. 2 extracts sound features from the audio portion of the unknown media (block 404). The sound identifier 228 may compare sound samples extracted from the audio portion of the media to a database of previously stored sounds. The previously stored sounds have words describing the sound that are associated with the stored sounds. When a match between a sound segment and a previously stored sound is found, the word describing the sound is used as the output to the sound identifier 228. Flow continues at block 406.

The song or tune identifier 230 of FIG. 2 extracts song or tune features from the unknown media (block 406). The song or tune identifier 230 may extract samples of music or notes from the audio portion of the media. The song or tune can be compared to a database of previously stored songs or tunes. The database may be private or may be a public database accessible through the Internet. When a match is found, the song title or the company associated with the song or tune is used as the output of the song or tune identifier 230. Flow continues at block 308 of FIG. 3.

The flow chart of FIG. 3 shows the process of extracting audio features from the unknown media as a linear process. In other examples, the steps shown in blocks 402, 404 and 406 may be executed in parallel using multiple copies of the audio portion of the unknown media.

Figure 5:
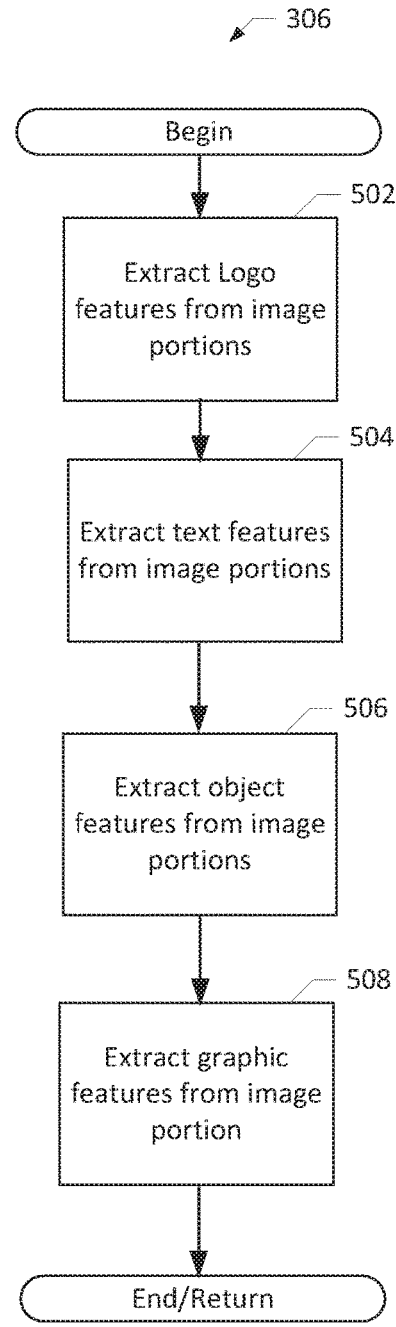
FIG. 5 is a flowchart representative of example machine readable instructions for implementing the extract image features functionality of FIG. 3.

FIG. 5 is a flowchart representative of example machine readable instructions for implementing the process in block 306 of FIG. 3 (extract image features). The logo recognition engine 232 of FIG. 2 extracts logo features from the image portions of the unknown media (block 502). The logo recognition engine 232 uses a database of previously identified logos. The logo recognition engine 232 uses pattern matching between areas identified in the images of the unknown media and the database of previously identified logos. When a match is found, the logo recognition engine 232 uses the brand as an output. A brand may include a company name, a product name, a product type, a word or phrase that identifying a product, service, or organization. Some example brands are: Coke, Tide, Ford, Kleenex and Windows. Flow continues at block 504.

The optical character recognition (OCR) engine 234 of FIG. 2 extracts printed words from the image portion of the unknown media (block 504). The output from the OCR engine is a list of words that were printed in the image portion of the unknown media. Flow continues at block 506.

The object recognition engine 236 of FIG. 2 extracts object features from the image portions of the unknown media (block 506). The object recognition engine 236 uses pattern matching between a database of previously identified objects and objects located in the image portions of the unknown media. When a match is found, the object recognition engine 236 output the name of the recognized object. Flow continues at block 508.

The graphic recognition engine 238 of FIG. 2 extracts graphic features from the image portion of the unknown media (block 508). The graphic recognition engine 238 locates and identifies graphic features in an image. The graphic features identified may include a dominant color, shapes, for example a square, distinct horizontal or vertical lines, and the like. The output of the graphic recognition engine 238 is a list of words describing the geographic features identified in the image portions of the media. Flow continues at block 308 of FIG. 3.

Figure 6:
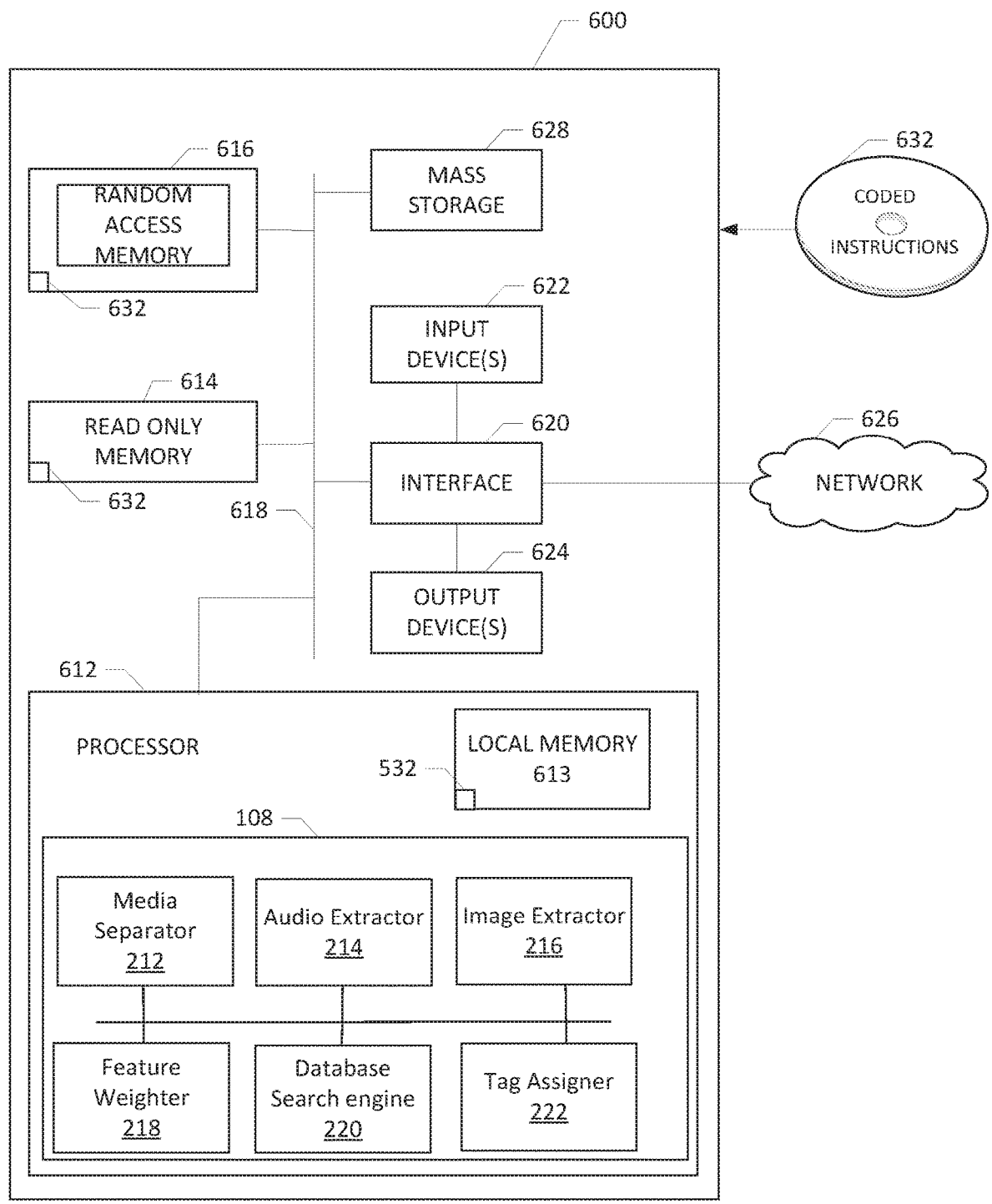
FIG. 6 is a block diagram of an example processor platform capable of executing the instructions of FIGS. 3, 4 and 5 to implement the media tagger of FIG. 2.

FIG. 6 is a block diagram of an example processor platform 600 capable of executing the instructions of FIGS. 3, 4 and 5 to implement the media tagger 108 of FIG. 2. The processor platform 600 can be, for example, a server, a personal computer, a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. In the illustrated example of FIG. 4, the processor 612 is configured via example instructions 632 to implement the example media separator 212, the example audio extractor 214, the example image extractor 216, the example feature weighter 218, the example database search engine 220, the example tag assigner 222 and the example media tagger 108 of FIG. 2

The processor 612 of the illustrated example includes a local memory 613 (e.g., a cache). The processor 612 of the illustrated example is in communication with a main memory including a volatile memory 616 and a non-volatile memory 614 via a bus 618. The volatile memory 616 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 614 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3, 4 and 5 may be stored in the mass storage device 628, in the volatile memory 616, in the non-volatile memory 614, and/or on a removable tangible computer readable storage medium such as a CD or DVD.

From the foregoing, it will appreciate that the above disclosed methods, apparatus and articles of manufacture to determine tags for media using multiple media features uses both the audio and image portions of the media to identify media features. In some examples, multiple different recognition engines or recognition technologies are used on the audio portion of the media and on the image portions of the media to identify the media features.

The methods, apparatus and articles of manufacture to determine tags for media using multiple media features uses feedback between the different recognition engines or recognition technologies to weight the features identified by the recognition engines or recognition technologies. In addition some identified features are assigned to categories, for example a company, brand, product type, or the like. The categories that have assigned value may be used to limit the scope of a search, or to adjust the weight of a feature.

The methods, apparatus and articles of manufacture to determine tags for media using multiple media features searches a database of pre-tagged documents to determine the tags for the media being tagged. Multiple search engines may be used to search the database of pre-tagged documents. The weighted features are used for queries for the search engines.

The results of the searches are a list of pre-tagged documents, along with the tags, with relevancy scores indicating how relevant the document is with respect to the media being tagged. In some examples, when the relevancy score is above a relevancy score threshold, the tag is automatically assigned to the media.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to tag unknown media, the apparatus comprising:
    memory including computer readable instructions; and
    processor circuitry to execute the instructions to at least:
        extract features from audio and image portions of the unknown media;
        weight the features based at least partially on respective recognition technologies used to extract the features to determine corresponding weighted features, a first weight assigned to a first feature extracted by an image-based recognition technology, and a second weight, different from the first weight, assigned to a second feature extracted by an audio-based recognition technology;
        search a database of pre-tagged media with a combination of the weighted features to generate a list of suggested tags for the unknown media;
        when the first feature is included in the combination of the weighted features and is assigned to a first category of a plurality of categories, limit the search in the database to pre-tagged media having category values matching the first category of the first feature; and
        assign one or more tags from the list of suggested tags to the unknown media.

2. The apparatus of claim 1, wherein the processor is to extract the features from the audio portion of the unknown media using at least one of a speech recognition engine, a sound identifier, or a song or tune identifier.

3. The apparatus of claim 1, wherein the processor is to extract the features from the image portions of the unknown media using at least one of a logo recognition engine, an OCR engine, an object recognition engine, or a graphic recognition engine.

4. The apparatus of claim 1, wherein the tags are approved by a user.

5. The apparatus of claim 1, wherein the list of suggested tags includes relevancy scores indicating how relevant the tags are with respect to the unknown media, and the processor is to automatically approve a tag in the list of suggested tags when the relevancy score for the tag is above a threshold relevancy score.

6. An apparatus to tag unknown media, the apparatus comprising:
    memory including computer readable instructions; and
    processor circuitry to execute the instructions to at least:
        extract features from audio and image portions of the unknown media;
        weight the features based at least partially on respective recognition technologies used to extract the features to determine corresponding weighted features, a highest weight assigned to ones of the features extracted by a logo recognition engine, a next highest weight assigned to ones of the features extracted by an optical character recognition (OCR) engine, a next highest weight assigned to ones of the features extracted by a speech recognition engine, and a lowest weight assigned to ones of the features extracted by a graphic recognition engine;
        search a database of pre-tagged media with a combination of the weighted features to generate a list of suggested tags for the unknown media; and
        assign one or more tags from the list of suggested tags to the unknown media.

7. A tangible computer readable medium comprising computer readable instructions which, when executed, cause a processor to at least:
    extract features from audio and image portions of the unknown media;
    weight the features based at least partially on respective recognition technologies used to extract the features to determine corresponding weighted features, the instructions to cause the processor to assign a first weight to a first feature extracted by an image-based recognition technology, the instructions to cause the processor to assign a second weight, different from the first weight, to a second feature extracted by an audio-based recognition technology;
    search a database of pre-tagged media with a combination of the weighted features to generate a list of suggested tags for the unknown media, when the first feature is included in the combination of the weighted features and is assigned to a first category of a plurality of categories, the instructions cause the processor to limit the search in the database to pre-tagged media having category values matching the first category of the first feature; and
    assign one or more tags from the list of suggested tags to the unknown media.

8. The computer readable medium of claim 7, wherein the instructions cause the processor to extract the features from the audio portion of the unknown media using at least one of a speech recognition engine, a sound identifier, or a song or tune identifier.

9. The computer readable medium of claim 7, wherein the instructions cause the processor to extract the features from the image portions of the unknown media using at least one of a logo recognition engine, an OCR engine, an object recognition engine, or a graphic recognition engine.

10. The computer readable medium of claim 7, wherein the tags are approved by a user.

11. The computer readable medium of claim 7, wherein the list of suggested tags includes relevancy scores indicating how relevant the tags are with respect to the unknown media, and the instructions cause the processor to automatically approve a tag in the list of suggested tags when the relevancy score for the tag is above a threshold relevancy score.

12. A tangible computer readable medium comprising computer readable instructions which, when executed, cause a processor to at least:
  extract features from audio and image portions of the unknown media;
  weight the features based at least partially on respective recognition technologies used to extract the features to determine corresponding weighted features, the instructions to cause the processor to assign a first weight to a first feature extracted by an image-based recognition technology, the instructions to cause the processor to assign a highest weight to ones of the features extracted by a logo recognition engine, a next highest weight to ones of the features extracted by an optical character recognition (OCR) engine, a next highest weight to ones of the features extracted by a speech recognition engine, and a lowest weight to ones of the features extracted by a graphic recognition engine;
  search a database of pre-tagged media with a combination of the weighted features to generate a list of suggested tags for the unknown media; and
  assign one or more tags from the list of suggested tags to the unknown media.

13. An apparatus to tag unknown media, the apparatus comprising:
  means for extracting features from audio and image portions of the unknown media;
  means for weighting the features based at least partially on respective recognition technologies used to extract the features to determine corresponding weighted features, a first weight assigned to a first feature extracted by an image-based recognition technology, and a second weight, different from the first weight, assigned to a second feature extracted by an audio-based recognition technology;
  means for searching a database of pre-tagged media with a combination of the weighted features to generate a list of suggested tags for the unknown media;
  when the means for extracting assigns the first feature included in the combination of the weighted features to a first category of a plurality of categories, the means for searching is to limit the search in the database to pre-tagged media having category values matching the first category of the first feature; and
  means for assigning one or more tags from the list of suggested tags to the unknown media.

14. The apparatus of claim 13, wherein the means for extracting is to extract the features from the audio portion of the unknown media using at least one of a speech recognition engine, a sound identifier, or a song or tune identifier.

15. The apparatus of claim 13, wherein the means for extracting is to extract the features from the image portions of the unknown media using at least one of a logo recognition engine, an OCR engine, an object recognition engine, or a graphic recognition engine.

16. The apparatus of claim 13, wherein the tags are approved by a user.

17. The apparatus of claim 13, wherein the list of suggested tags includes relevancy scores indicating how relevant the tags are with respect to the unknown media, and the means for assigning is to automatically approve a tag in the list of suggested tags when the relevancy score for the tag is above a threshold relevancy score.

18. An apparatus to tag unknown media, the apparatus comprising:
  means for extracting features from audio and image portions of the unknown media;
  means for weighting the features based at least partially on respective recognition technologies used to extract the features to determine corresponding weighted features, a highest weight assigned to ones of the features extracted by a logo recognition engine, a next highest weight assigned to ones of the features extracted by an optical character recognition (OCR) engine, a next highest weight assigned to ones of the features extracted by a speech recognition engine, and a lowest weight assigned to ones of the features extracted by a graphic recognition engine;
  means for searching a database of pre-tagged media with a combination of the weighted features to generate a list of suggested tags for the unknown media; and
  means for assigning one or more tags from the list of suggested tags to the unknown media.

* * * * *